(12) United States Patent
Tsujimoto

(10) Patent No.: US 7,860,388 B2
(45) Date of Patent: Dec. 28, 2010

(54) IMAGE CAPTURING APPARATUS AND METHOD FOR OUT-OF-FOCUS DETERMINATION AND CORRECTION

(75) Inventor: Tokusuke Tsujimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 143 days.

(21) Appl. No.: 11/046,849

(22) Filed: Feb. 1, 2005

(65) Prior Publication Data

US 2005/0206774 A1 Sep. 22, 2005

(30) Foreign Application Priority Data

Feb. 4, 2004 (JP) ............................... 2004-028356

(51) Int. Cl.
*G03B 13/30* (2006.01)
(52) U.S. Cl. ..................................... 396/147
(58) Field of Classification Search ................. 396/147; 348/333.04, 345, 346, 349; 382/255
See application file for complete search history.

(56) References Cited

U.S. PATENT DOCUMENTS

| 4,827,303 | A | * | 5/1989 | Tsuboi .......................... 396/123 |
| 5,727,234 | A | * | 3/1998 | Sakagami et al. ................ 396/52 |

| 2003/0174230 | A1 | * | 9/2003 | Ide et al. ........................ 348/345 |
| 2004/0227839 | A1 | * | 11/2004 | Stavely et al. ................... 348/345 |

FOREIGN PATENT DOCUMENTS

| EP | 1 250 002 A1 | 10/2002 |
| JP | 05-127244 | 5/1993 |
| JP | 11-136557 | 5/1999 |
| JP | 2000-251060 | 9/2000 |
| JP | 2001-045340 | 2/2001 |
| JP | 2003-158646 | 5/2003 |
| WO | WO 91/19383 | 12/1991 |

* cited by examiner

*Primary Examiner*—Edward J Glick
*Assistant Examiner*—Chia-how Michael Liu
(74) *Attorney, Agent, or Firm*—Oblon, Spivak, McClelland, Maier & Neustadt, L.L.P.

(57) ABSTRACT

An image capturing apparatus includes: an image acquisition unit operable to acquire a plurality of captured images at least relating to the focus control among images captured by an image capturing unit; an image comparison unit operable to compare focus states of focus positions of the plurality of captured images acquired by the image acquisition unit; an out-of-focus determination unit operable to determine which captured images are not in focus, the captured images being included in the plurality of captured images compared by the image comparison unit; and an error display signal generating unit operable to generate a signal for displaying an error region on the display unit for the captured image determined to be out-of-focus by the out-of-focus determination unit.

13 Claims, 7 Drawing Sheets

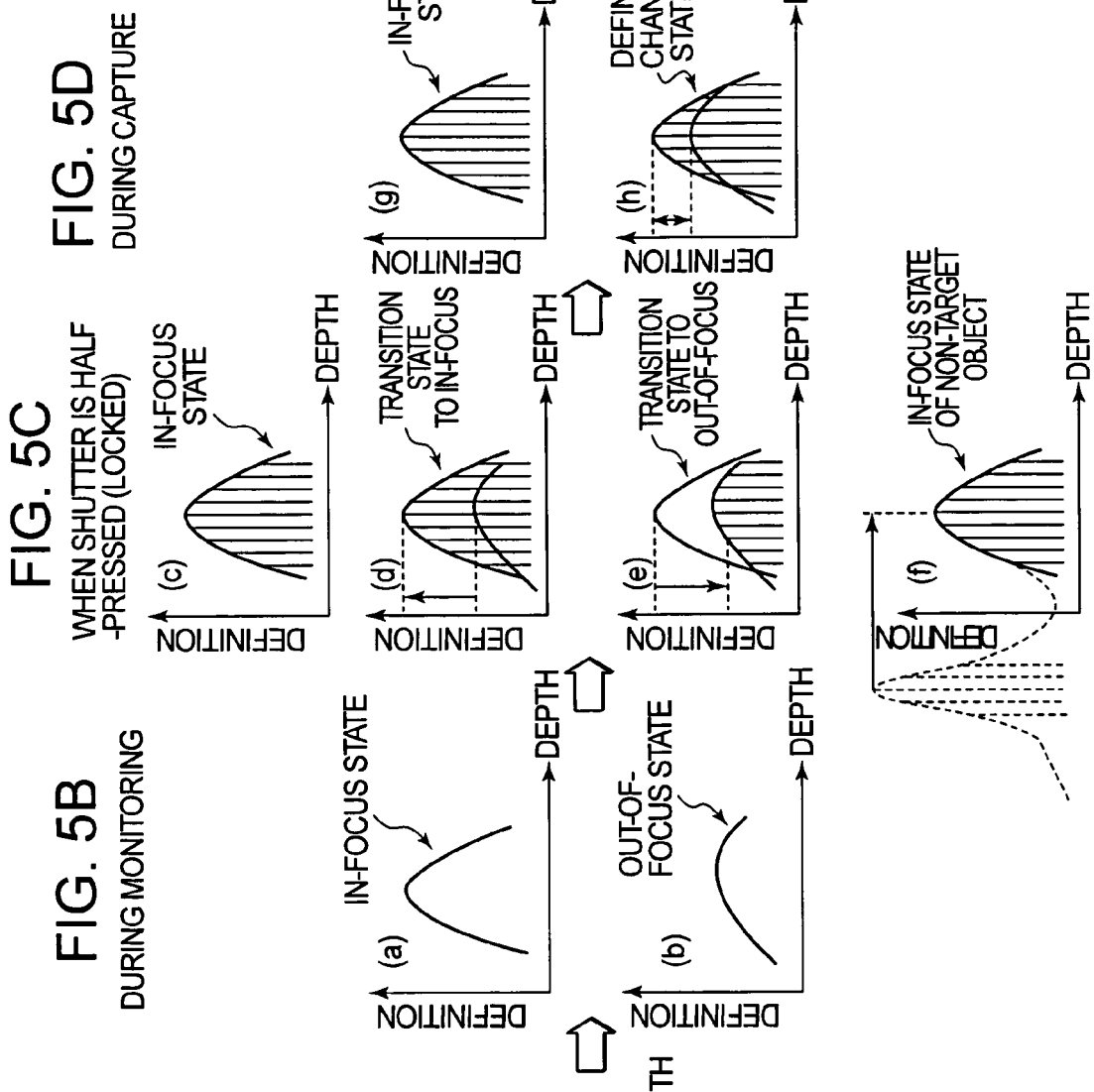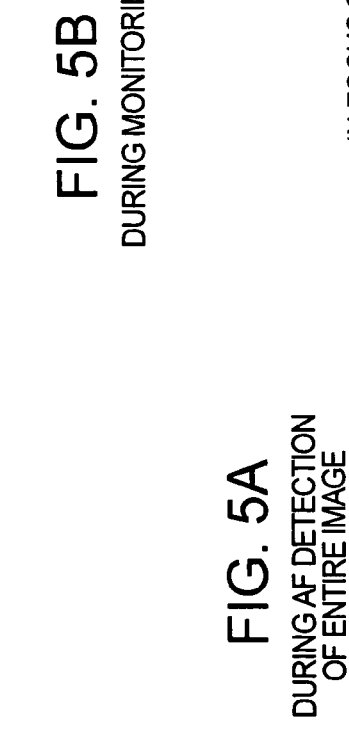

FIG. 6A  FIG. 6B  FIG. 6C
DURING MONITORING — WHEN SHUTTER IS HALF-PRESSED (LOCKED) — DURING CAPTURE
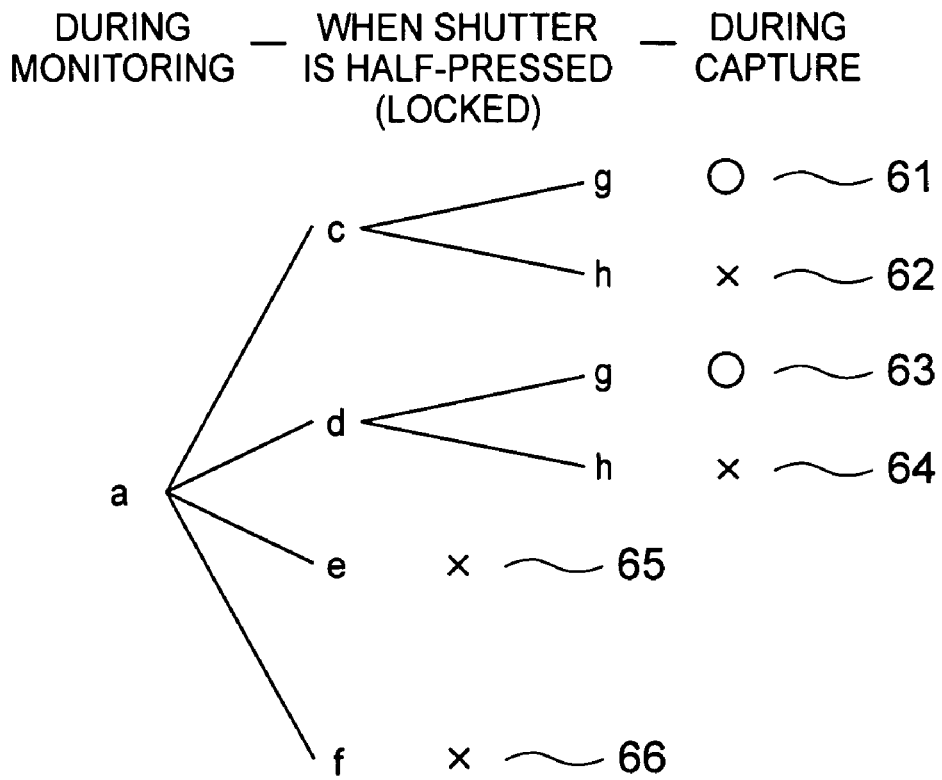
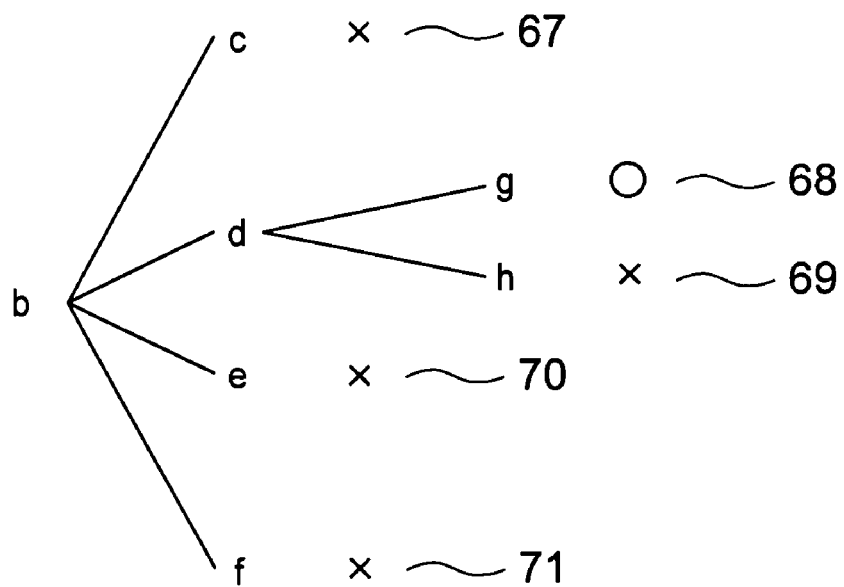

IN FOCUS: BLUE
OUT OF FOCUS: RED
NO CHANGE: NOTHING

EXAMPLES OF DISPLAYED COLORS

FAILED EXAMPLE 1: WHERE 1 IS IN-FOCUS

FAILED EXAMPLE 2: WHERE CAMERA SHAKE IS PRESENT

DEPTH

IMAGE-CAPTURING STATE

SUCCESSFUL EXAMPLE: WHERE 2 IS IN-FOCUS

IMAGE CAPTURING APPARATUS AND METHOD FOR OUT-OF-FOCUS DETERMINATION AND CORRECTION

CROSS REFERENCES TO RELATED APPLICATIONS

The present invention contains subject matter related to Japanese Patent Application JP 2004-028356 filed in the Japanese Patent Office on Feb. 4, 2004, the entire contents of which being incorporated herein by reference.

BACKGROUND OF THE INVENTION

1. Field of the Invention

The present invention relates to an image-capturing apparatus and image-capturing method applied, for example, to a digital camera, for detecting out-of-focusing state prior to capturing pictures in an appropriate manner.

2. Description of Related Art

Electronic camera devices such as digital cameras are equipped with display devices that can be used as monitors for confirming images during image-capturing operation. Images of subjects taken with this kind of digital camera are displayed as monitor images (so-called through-images) of a subject at the display devices after being subjected to photo-electric conversion by an image-capturing device such as a CCD (Charge Coupled Device) etc., signal conversion, and signal processing etc. A picture is then taken when a user presses the shutter at the desired timing while looking at the monitor image. The captured image of a subject after signal processing is then recorded and stored on a storage medium as recorded image data. The image information recorded to and saved on a recording medium may then be read out and reproduced at the display device such as a liquid crystal display or outputted to an external device.

Resolution of monitor images displayed at the display devices is usually lower than resolution of recorded images saved at a recording medium with these kinds of typical digital cameras. This means that images with lower definition than recorded images are displayed at the display devices. Giving an example of a certain type of digital camera on the market, resolution of recorded images is 640×480, while resolution of monitor images is 220×279. As a result, there is a problem that it may not be possible for a user to discern whether or not the captured image has become blurred due to camera-shake or being out-of-focus when a user presses a shutter at a time of watching the monitor image displayed on a liquid crystal display etc. of an image-capturing apparatus.

Digital cameras equipped with a function enabling part of an image to be displayed in an enlarged manner while playing back captured images therefore exist to overcome this problem. It is then possible for a user to enlarge part of the captured image to confirm focusing when using this kind of digital camera. In this event, it is necessary to follow through steps of image-capturing in recording mode, switching over to playback mode when the image-capturing has finished, and reproducing and enlarging the recorded image to confirm focusing, and then switching back to recording mode again if focusing is blurred in order to capture an image again. This therefore remains a complex and troublesome operations for a user. To address the above-described issue, there are proposed an electronic cameras capable of image-capturing while enlarging part of an image portion corresponding to a focused position of the captured monitor image in order to confirm focusing, and then displaying an enlarged captured image (for example, refer to Japanese Patent Application Publication JP 11-196301).

SUMMARY OF THE INVENTION

However, with the electronic camera disclosed in Japanese Patent Application Publication JP 11-196301, it is necessary for a user to determine whether or not an image is in-focus based on a low resolution image portion displayed in an enlarged manner, which makes determination of out-of-focus difficult. There is also a disadvantage that image-capturing opportunities may be lost because it is necessary to recapture when the captured image is not in-focus. It is therefore advantageous to provide an image-capturing apparatus that does not require a user to determine whether or not an image is in-focus, that is capable of making a user aware of focusing condition automatically for a plurality of captured images before and after focus control, and that displays out-of-focus regions during confirmation of captured images. The present invention is made in view of above described issues.

According to an embodiment of the present invention, there is provided an image-capturing apparatus. The image-capturing apparatus includes: image acquisition means for acquiring a plurality of captured images at least relating to the focus control among images captured by image-capturing means; image comparison means for comparing focus states of focus positions of the plurality of captured images acquired by the image acquisition means; out-of-focus determination means for determining which captured images are not in focus, the captured images being included in the plurality of captured images compared by the image comparison means; and error display signal generating means for generating a signal for displaying an error region at display means for the captured image determined to be out-of-focus by the out-of-focus determination means.

According to another embodiment of the present invention, there is provided an image-capturing method. The image-capturing method includes: an image acquisition step of acquiring a plurality of captured images at least relating to the focus control among images captured by an image-capturing means; an image comparison step of comparing focus states of focus positions of the plurality of captured images acquired by the image acquisition step; an out-of-focus determination step of determining which captured images are not in focus, the captured images being included in the plurality of captured images compared by the image comparison step; and an error display signal generating step of generating a signal for displaying an error region on the display means for the captured image determined to be out-of-focus by the out-of-focus determination step.

In the embodiment of the present invention described above, the image acquisition means acquires, as the plurality of captured images relating to focus control, an image displayed on the display means before the focus control, an image displayed on the display means after the focus control and an image displayed on the display means before recording to a recording medium by the recording means. These images are acquired with a form that allows further processing in latter stages. The image comparison means compares the focusing states of focus positions of the image displayed on the display means prior to the focus control, the image displayed on the display means after the focus control and the image displayed on the display means before recording to a recording medium by the recording means. The out-of-focus determination means determines which of the compared the image displayed on the display means prior to the focus control, the image displayed on the display means after the focus control, and the image displayed on the display means before recording to a recording medium by the recording means are out-of-focus. The error display signal generating means generates the signal for displaying an error region on the display means for the captured image determined not to be in focus.

The images displayed on the display means before the focus control, the image displayed on the display means after the focus control, and the image displayed on the display means before recording to a recording medium by the recording means may be used as the plurality of captured images relating to the focus control. By using this plurality of images, rather than enlarging the captured image for confirmation, it can be understood which of these images is in focus with a target subject intended by the user. In the event that there is a possibility of out-of-focus, a warning is issued to the user in the form of a message or sound, and it is possible to display regions for which the focusing is actually blurred.

According to the embodiments of the present invention, it is possible for blurred or out-of-focusing images, which are difficult to confirm on a display of an image capturing apparatus when image capturing in the related art, to be automatically determined by an image capturing apparatus and displayed as such regions. The user may therefore be aware of blurred or out-of-focusing image in a more straightforward manner and is capable of issuing instructions such as selecting more appropriate images. Furthermore, the images other than the image recorded on a recording medium, i.e. the image displayed on the display means before the focus control and the image displayed on the display means after the focus control are also obtained and may be utilized in interpolation. Photographs of the target subject that are reliably in-focus may therefore be taken using the embodiments of the present invention, and this makes the operation of the image capturing apparatus straightforward even for first-time users and youths who have not much experience.

BRIEF DESCRIPTION OF THE DRAWINGS

The above and other objects, features and advantages of the present invention will become more apparent from the following description of the presently exemplary embodiment of the invention taken in conjunction with the accompanying drawings, in which:

FIG. 5 is a view showing theory for evaluation processing, FIG. 5A is for the time of AF detection for the whole screen, FIG. 5B is for the time of monitoring, FIG. 5C is for the time of half-pressing (locking) a shutter, and FIG. 5D is for the time of capture;

FIG. 6 is a view showing determination by combining evaluation procedures, FIG. 6A is for the time of monitoring, FIG. 6B is for the time of half-pressing (locking) a shutter, and FIG. 6C is for the time of capture;

FIG. 8 is a view showing an error display example, where

DETAILED DESCRIPTION OF THE EMBODIMENTS

Figure 1:
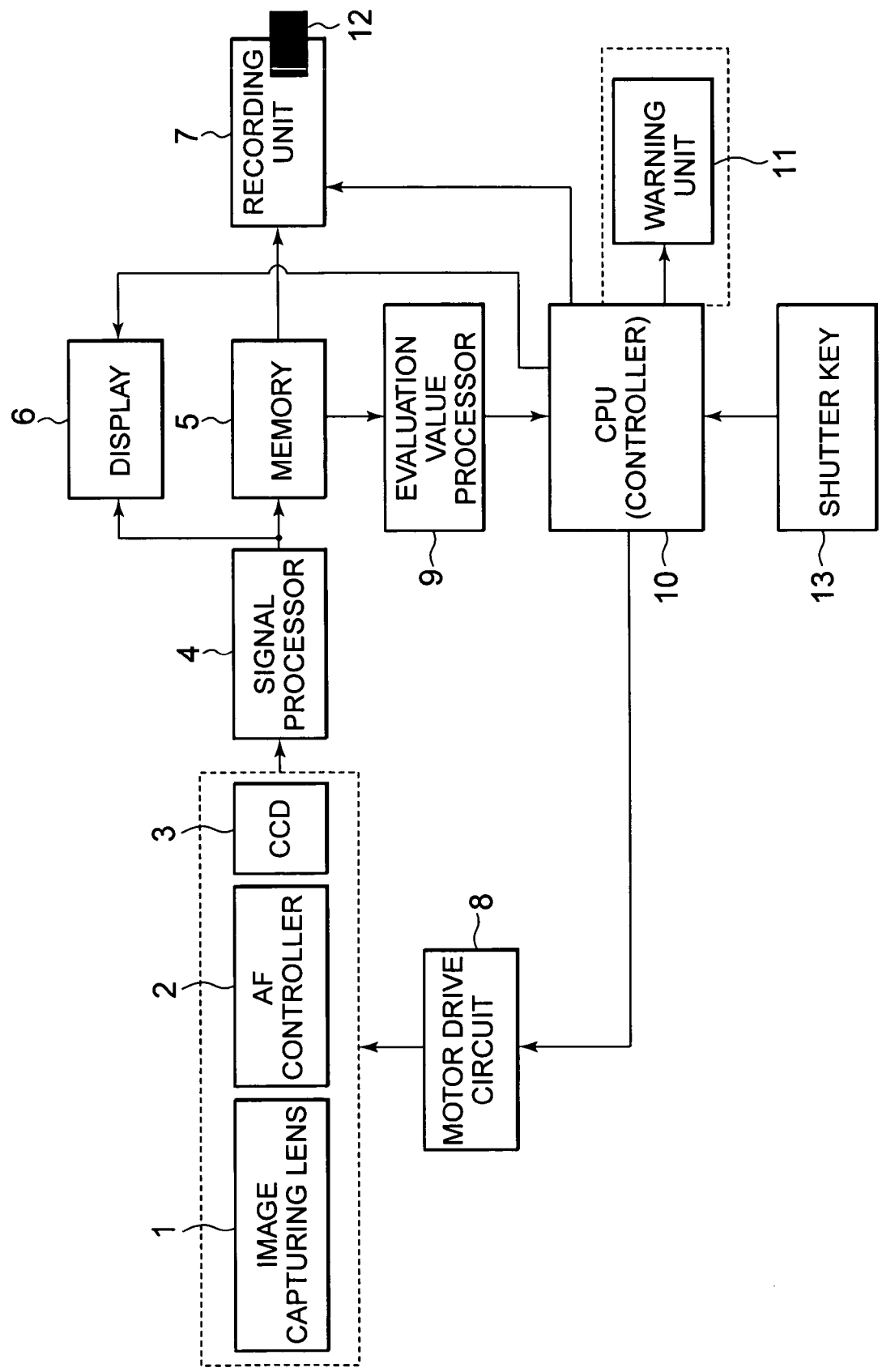
FIG. 1 is a block diagram showing a configuration of an image-capturing apparatus according to an embodiment of the present invention.

In the following, a description of an embodiment of the present invention is given with reference to drawings. FIG. 1 is a block diagram showing a configuration taken as a first embodiment of an image-capturing apparatus according to the present invention. As shown in FIG. 1, this image-capturing apparatus includes an optical system block and a control system block. The optical system block includes an image-capturing lens 1, an AF controller 2 having an auto-focus (AF) lens, a motor drive circuit 8 for driving a motor of the AF controller 2, and a solid-state imaging device 3 such as a CCD etc. The control system block includes a signal processor 4, an internal memory 5, a display 6 such as a liquid crystal panel etc., a recording unit 7 for recording captured data in a recording medium 12, an evaluation value processor 9 for processing evaluation values for focusing extracted from a high-frequency component, a warning unit 11 for issuing messages or sounds etc. to a user in the event of out-of-focus, a shutter key 13 for designating locking of auto-focus control upon being pushed down halfway and designating an image-capturing operation upon being pushed all the way down, and a CPU (Central Processing Unit) 10 for controlling these items described above.

In a normal operation, if a power supply switch is turned on, a power supply voltage is supplied from a power supply unit (not shown) and the display 6 for displaying a monitor image enters a monitoring state. Light reflected from a target subject is focused by the auto-focus lens of the AF controller 2 via the image-capturing lens 1 so as to form an image on a light-receiving surface of the solid-state imaging device 3 such as a CCD, etc. The image formed at the light-receiving surface is then converted to an amount of signal charge corresponding to the amount of reflected light forming this image and is displayed on the display 6 such as a liquid crystal panel, etc.

In this stage of the operation, data for reflected light forming an incident image is stored temporarily in the internal memory 5, a high-frequency component of this saved data is supplied to the evaluation value processor 9, and an evaluation value for focusing is formed and sent to the CPU 10. The CPU 10 then sequentially controls the motor drive circuit 8 in such a manner that the auto-focus lens is put in-focus by the AF controller 2 based on data provided by the evaluation value processor 9. The auto-focus control is executed at the time of pressing the shutter key 13 half-way down.

Figure 2:
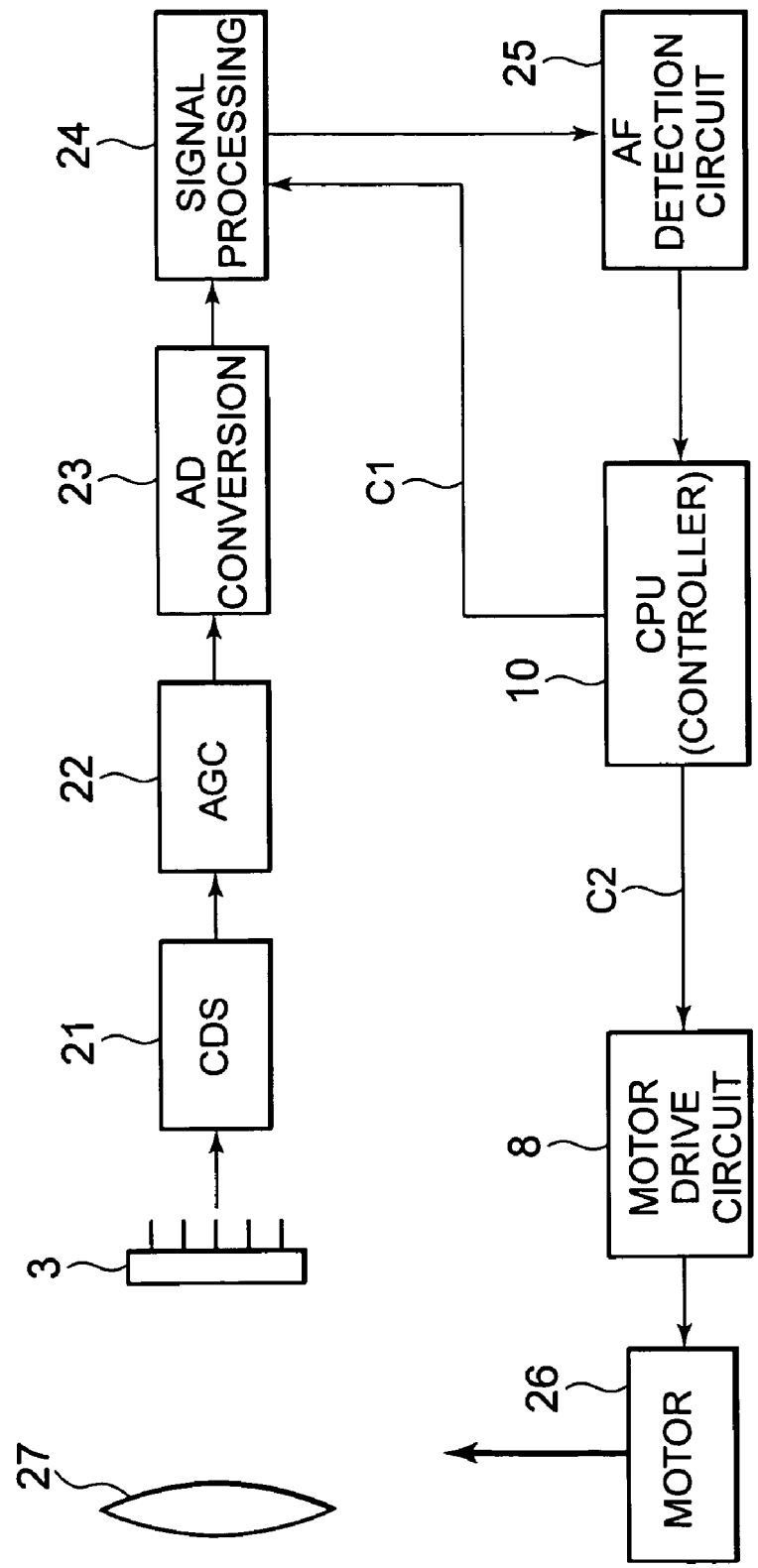
FIG. 2 is a view showing an example of a configuration for an AF controller.

An example configuration for an AF controller is shown in FIG. 2. In FIG. 2, a captured image is subjected to photoelectric conversion by the solid-state imaging device 3 such as a CCD etc., and is subjected to signal conversion processing by a CDS (Correlated Double Sampling Circuit) 21, AGC (Automatic Gain Control) 22, and AD (Analog to Digital) converter 23. After this, at a signal processor 24, a high-frequency component for the image is extracted based on a detection range selection C1 from the CPU 10 and is sent to an AF detection circuit 25. The AF detection circuit 25 integrates this inputted high-frequency component to one field period. The CPU 10 then supplies a control signal C2 to the motor drive circuit 8 in such a manner that this integrated value becomes a maximum and controls a motor 26 so as to move an auto-focus lens 27.

Definition data for the monitor image is also temporarily stored in the internal memory 5 as shown in FIG. 1 during auto-focus control. A monitor image is also displayed at the display 6 in this auto-focus control state. When the shutter key 13 is pressed half-down from this state so as to lock auto-focus control, an image can be focused in a comparatively straightforward manner using the auto-focus control method shown in FIG. 2, etc. Definition data for the monitor image immediately prior to half-down pressing of the shutter key 13 is held as is, and definition data for the time of locking is also held as is. A monitor image for this monitoring state and locked state is displayed at the display 6. In the event that the shutter key 13 is then pressed completely down, image data is captured and stored in the internal memory 5. In the event that this captured state is also displayed as a monitor image at the display 6, definition data may also be calculated in a similar manner from a high-frequency component for an actually captured image.

Definition data for the three images described above, i.e. definition data for a monitor image, locked image, and captured image is then supplied to the evaluation value processor 9 and subjected to arithmetic processing. The CPU 10 then determines camera shake and/or out-of-focusing based on results of this arithmetic processing. In the event that there is a possibility that out-of-focusing may have occurred, the user is notified via the warning unit 11 and prompted as to whether or not a recording to the recording medium 12 should be performed.

Figure 3:
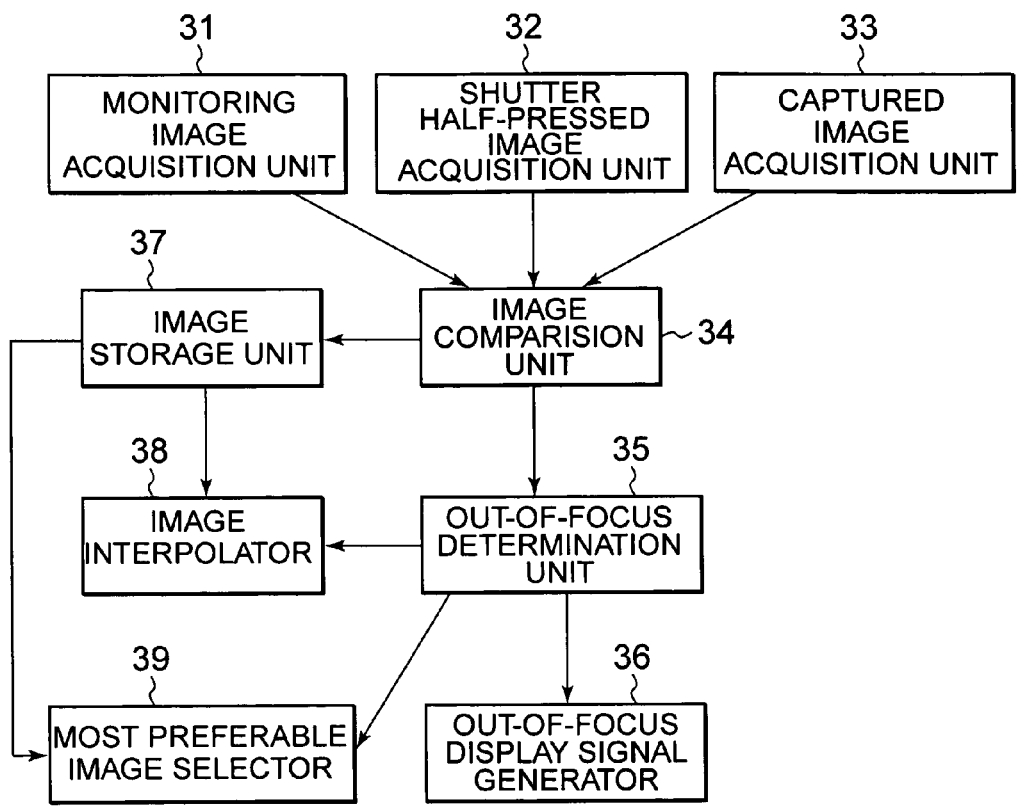
FIG. 3 is a block view of functions of a CPU in out-of-focusing detection.

FIG. 3 is a function block diagram of the CPU relating to detection of out-of-focusing. In addition to the function block for the CPU, FIG. 3 shows function blocks for the memory 5 and the evaluation value processor 9. In FIG. 3, a monitoring image acquisition unit 31 is a function block for acquiring the monitor image, in the event of monitoring, displayed at the display 6 prior to focus control immediately before image-capturing, and a shutter half-pressed image acquisition unit 32 is a function block for acquiring the locked image in the event of locking auto-focus control after focus control. Further, a captured image acquisition unit 33 is a function block for acquiring the captured image in the event of image capturing where data for the captured image is saved in the internal memory 5.

An image comparison unit 34 is a function block for comparing focus states of focus positions of a monitor image, locked image and captured image. An out-of-focus determination unit 35 is a function block for determining which of the image of the monitor image, locked image and captured image compared by the image comparison unit 34 is not in focus. An out-of-focus display signal generator 36 is a function block for generating a signal for displaying an error region on the display 6 for the captured image determined not to be in focus by the out-of-focus determination unit 35.

An image storage unit 37 is a function block for storing the monitor image, locked image and captured image compared by the image comparison unit 34. An image interpolator 38 is a function block for carrying out interpolation based on the out-of-focus result for the captured images, which are included in the images stored in the image storage unit 37 and determined to be out-of-focus by the out-of-focus determination unit 35. A most preferable image selector 39 is a function block for switching the captured image determined to be out-of-focus by the out-of-focus determination unit 35 with more preferable another image that is better in focus based on the out-of-focus determination result, the another more preferable image being one of the images stored in the image storage unit 37.

As shown in FIG. 3, it is then possible to determine an out-of-focus image portion of the captured image as a result of the out-of-focus determination unit 35 by calculating a difference between evaluation values using these three image information described above. In this event, the out-of-focus display signal generator 36 generates the error region display signal for display of the portion for which focusing is blurred so as to be marked with a color different from that of other regions on a preview screen of the display 6, thereby giving an out-of-focus alarm to the user via the warning unit 11. In this manner, in the event that the out-of-focus occurs for the captured image of the target subject, such portions are marked to make it easy for the user to be aware of such portions. Further, because it is easy for the user to be aware of portions for which focusing is blurred, it is also possible for the user capturing images to take sufficient measures on blurring portions which are not well attended by the user or blurring portions corresponding to objects which are always moving such as flags.

Figure 4:
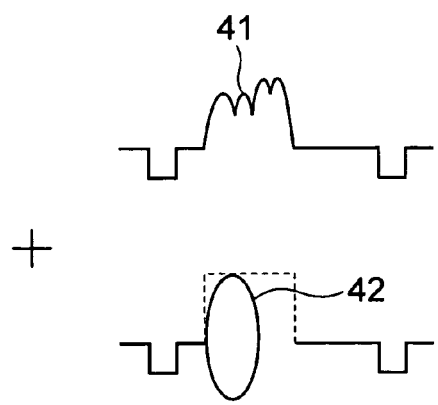
FIG. 4 is a view showing signal generation for an out-of-focus display signal generator.

FIG. 4 is a view showing signal generation in the out-of-focus display signal generator. In FIG. 4, regarding a captured image 41 determined by the out-of-focus determination unit 35 to have both portions that are not in-focus and portions that are in focus, the out-of-focus display signal generator 36 shown in FIG. 3 generates a display signal 42 with red indicating erroneous regions or blue indicating focused regions, and sends this display signal 42 to the display 6 of FIG. 1. The red or blue display signal 42 is then added to the captured image 41 and displayed at the display 6.

FIG. 5 is a view showing principle for evaluation processing. FIG. 5A is for the time of AF detection for the whole screen, FIG. 5B is for the time of monitoring, FIG. 5C is for the time of half-pressing (locking) the shutter, and FIG. 5D is for the time of capture. FIG. 6 is a view showing determination by combining evaluation procedures. FIG. 6A is for the time of monitoring, FIG. 6B is for the time of half-pressing (locking) the shutter, and FIG. 6C is for the time of capture.

FIG. 5A shows an image 51 for single line (of a target object as shown in FIG. 8) of a detection frame of an AF detection region in the event of AF detection for the entire screen, with the vertical axis showing evaluation values (definition or sharpness) obtained from the image and the horizontal axis showing depth position of the image. First, typically, a plurality of definition peaks (I), (II) and (III) exist within a single image as shown for the event of AF detection for the entire screen of FIG. 5A.

In the event of the monitoring shown in FIG. 5B, focusing is lined up with a single peak (II) from the plurality of peaks for which definition is the highest. Two situations are taken into consideration in the event of monitoring. Namely, during the monitoring, one is a focused state (in-focus state) where the peak is high and focusing is substantially in-focus as shown in (a), and another is an out-of-focus state where a peak is low and focusing is out-of-focus as in (b).

In this situation, when the shutter key 11 is half-pressed down as shown in FIG. 1, a transition is made to an locking state of auto-focus control shown in FIG. 5C, and the auto-focus lens 27 (refer to FIG. 2) is fixed in the focus position using an auto-focus control method etc. as described above. In this event, the states that may be considered are: an in-focus state as in (c) where the peaks is the same as for (a) with substantially the same definition; a transition state to an in-focus state as in (d) where the peak is the same as for (a) or (b) at the time of monitoring and moving in a direction where definition is increasing (in a direction where a peak shown by an arrow is becoming larger), i.e. in a direction of coming into in-focus; a transition state to the out-of-focus state as in (e)

where, conversely to (d), a direction is being moved in where the peak becomes smaller, definition falls off (a direction where a peak shown by an arrow becomes smaller) and focusing becomes more blurred; and a state as in (f) where a peak being focused to is shifting from a peak (dotted line) (II) to another peak (III), i.e. when focusing has taken place to a subject that the user does not wish to photograph.

Next, as shown by the thick solid line in FIG. 5D, in the event of actual capturing of an image, a plurality of states may be considered. The states include an in-focus state as in (g) where capturing takes place with the same proper focusing as in the time of locking, and states for other cases such as (h) where a thick line changes (if falling, camera shake or out-of-focusing has occurred, if rising, an item of high light intensity has entered in the picture by an accident, etc.) due to whatever reason so as to change the definition. Various causes can be considered for this out-of-focusing, and in reality, factors causing out-of-focusing are discerned from combinations of these various causes.

FIG. 6 illustrates out-of-focusing determination schemes in a tree-structure indicating combinations of various causes, with a circle mark indicating successful focusing and a x mark indicating that there is the possibility of out-of-focusing. First, at the in-focus state of (a) during the monitoring shown in FIG. 6A, if the peak becomes smaller at the time of locking as shown in (e) of FIG. 6B, or if the state becomes one where moved to another peak as in (f), there is a high possibility that the image captured afterward may be in the out-of-focusing state. In these cases, out-of-focusing occurs as shown by a mark x 65 or a mark x 66, and a warning is issued to the user via the warning unit 11 (refer to FIG. 1). Further, with regards to the state of (c) of FIG. 6B where the in-focus state is maintained, or that of (d) where the state is moved to a transition state to in-focus where the same peak is further focused, the out-of-focusing is removed for the state of (g) at the time of the capture as shown in FIG. 6C, i.e. the out-of-focusing is eliminated as shown by O (circle) marks 61 and 63 only for the states where the focusing is in focus at the time of locking shown in FIG. 6B. On the other hand, in the event that the definition of the captured image changes as in (h) of FIG. 6C, there is the possibility of out-of-focusing, giving rise to marks x62 and x64, and the user is warned via the warning unit 11.

Next, a description is given of the case of (b) at the time of monitoring as shown in FIG. 6A where focusing is not in-focus. A difference from (a) is that when a definition peak for (c) at the time of locking shown in FIG. 6B is the same as the time for monitoring shown in FIG. 6A, out-of-focusing is occurred as shown by the mark x67, and a warning is issued to the user via the warning unit 11 (refer to FIG. 1). It is therefore possible to specify items for which there is a possibility of out-of-focusing after image-capturing, and it is possible for the user to be warned to this effect. Items for which it is determined that out-of-focus is occurred are then marked in the manner shown in FIG. 8 thereafter using the previous three items of image information and out-of-focusing can be corrected.

Figure 7:
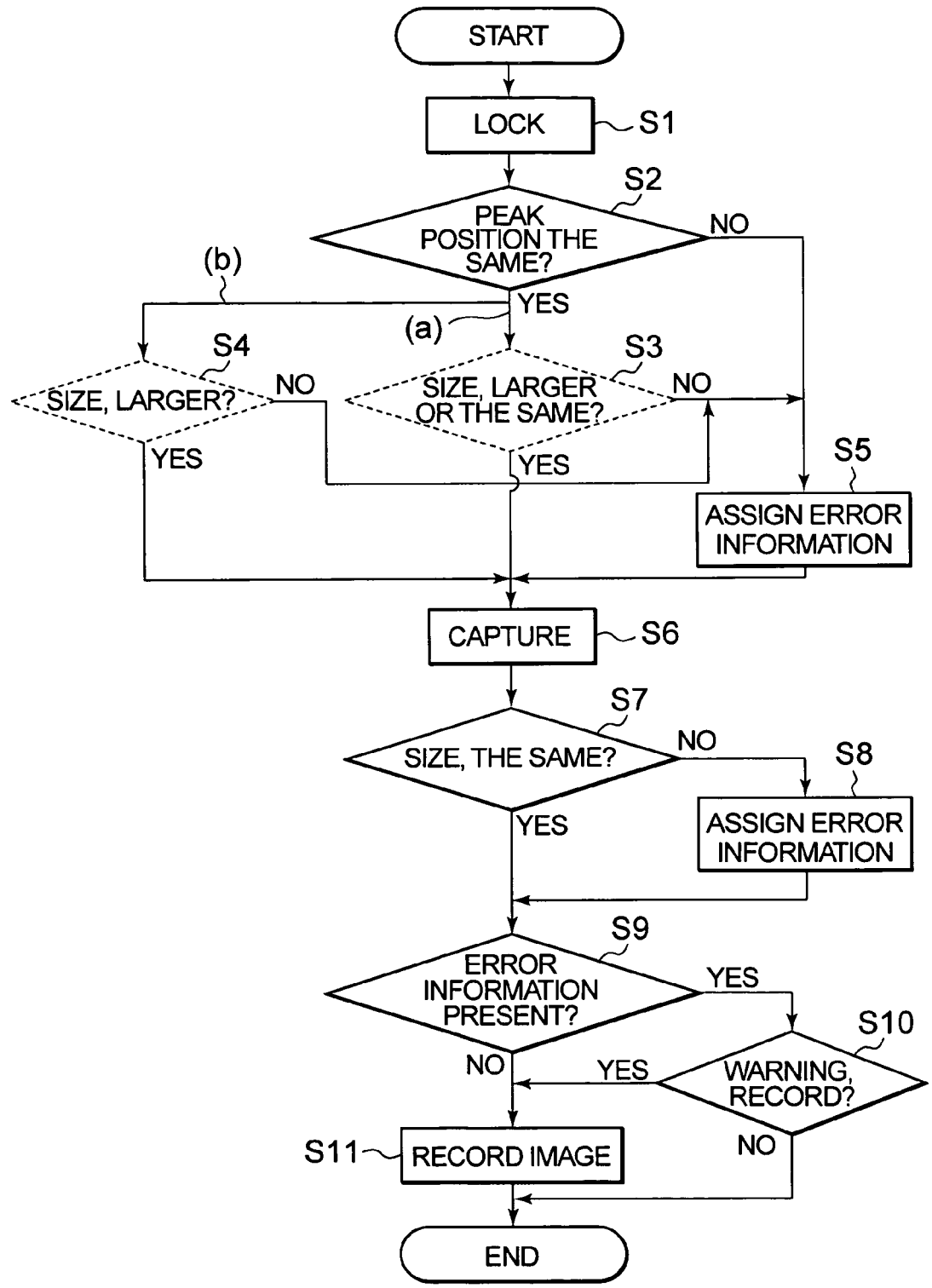
FIG. 7 is a flowchart showing an operation.

FIG. 7 is a flowchart showing an operation of an embodiment of the present invention. First, at the time of monitoring, the operation starts. At the start, data for definition at this time is held in the memory 5 of FIG. 1. Next, when the shutter is pressed down halfway so that the auto-focus control is locked, definition data for the time of locking is outputted from CCD 3 to the signal processor 4 (step S1). Next, a determination is made as to whether or not the position of the peak for definition is the same based on data for the monitoring time and locking time (step S2). If the position of the peak for the definition is different, error information is added to the effect that focusing has taken place in a manner that was not intended by the user (step S5).

When it is determined in determination step S2 that the position of the peak for definition is the same, a determination is made as to whether the peak has become bigger or smaller (step S3, S4). Namely, in the event that the focusing at the time of monitoring is in-focus (FIG. 6(a)), a determination is made as to whether or not the size of the peak for definition at the time of monitoring is the same as or larger than the size of the peak for definition at the time of locking (step S3). When it is determined in determination step S3 that the size of the peak for definition at the time of monitoring is smaller than the size of the peak for definition at the time of locking, error information is added (step S5). Conversely, in the event that it is determined in determination step S3 that the size of the peak for definition at the time of monitoring is the same as the size of the peak for definition at the time of locking or larger, the image is captured as is and definition data is made from the captured image (step S6).

On the other hand, in the event that the focusing at the time of monitoring is not in-focus (FIG. 5(b)), a determination is made as to whether or not the size of the peak for definition at the time of monitoring is larger than the size of the peak for definition at the time of locking (step S4). Here, error information is assigned in cases other than when the size of the peak for definition is larger than the size of the peak for definition at the time of locking so that focusing is in-focus (step S5).

Next, in the event that it is determined in determination step S3 that the size of the peak for definition at the time of monitoring is the same as the size of the peak for definition at the time of locking or larger, in the event that it is determined in determination step S4 that the size of the peak for definition at the time of monitoring is larger than the size of the peak for definition at the time of locking, and in the event that error information is added in step S5, image information is captured (step S6). The size of definition data obtained from this captured image and definition data for the time of locking is then compared (step S7).

In the event that it is determined in determination step S7 that the size of the peak for definition data obtained from the captured image is not the same as the size of the peak for definition data for the time of locking, i.e. it is determined that the size of the peak has changed, it is taken that focus has been shifted for some reason between the time of locking and the time of capture, error information is added (step S8), and the operation proceeds to step S9.

Further, in the event that it is determined in determination step S7 that the size of the peak for definition data acquired from the captured image is the same as the size of the peak for definition data for the time of locking, the next step is proceeded to without change, and a determination is made as to whether or not error information has been added with the step series flow up to this point (step S9).

In the event that it is determined in determination step S9 that there is no error information, this image is recorded in the recording unit 7 of FIG. 1 (step S11) and the monitoring state is again entered at the step end.

In the event that it is determined in determination step S9 that error information is present, the user is notified that out-of-focusing is possible via the warning unit 11 shown in FIG. 1, and the user is interrogated as to whether or not to record an image (step S10). In this event, marking is displayed for the recorded image using the three items of image information in such a manner that it can be understood which portions focusing is blurred for at the time of confirmation using a preview image etc.

FIG. 8 shows a display example for performing marking relating to an error display. FIG. 8A shows a state where columns for a certain subject 82 are stood up in the order 1, 2, and 3 from the front, for the case of image-capturing using an image-capturing apparatus 81 focused on the second column. At this time, in the event of image-capturing with the second column of the subject 82 in focus as shown in FIG. 8B, i.e. in the case of successful image-capturing, only an image of the subject 82 that has normally not been subjected to any kind of processing is displayed at the confirmation screen 83 displayed at the display 6 shown in FIG. 1.

Figure 8E:
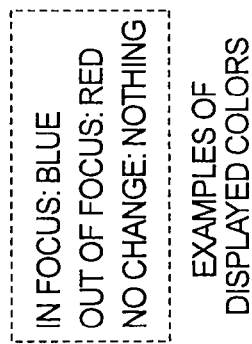
FIG. 8E shows examples of using colors as focus indicia.
Figure 8C:
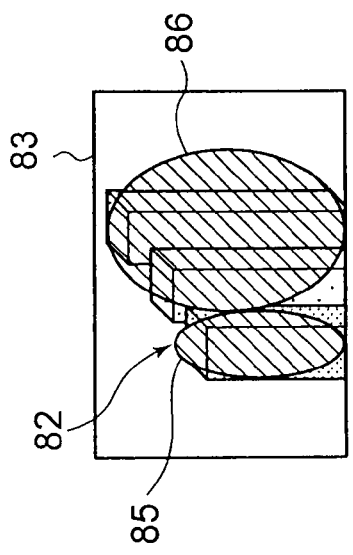
FIG. 8C is a failed example 1.

However, in the event that, for example, the first column is focused on rather than the intended second column 2 of the subject 82, i.e. when the image-capturing is mistaken, marking is carried out as shown in FIG. 8C and displayed. Blue marking 85 is therefore displayed for the first column advancing in a direction of going into focus and red marking 86 is displayed for the second and third columns advancing in a direction where out-of-focusing occurs. In this example, the first column is blue and other columns are red. As a result, it is possible for the user to be made aware of which parts are out-of-focus in a straightforward manner.

Figure 8D:
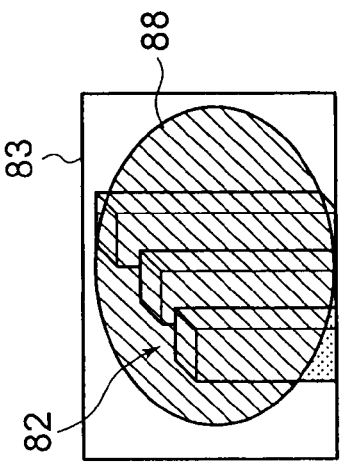
FIG. 8D is a failed example 2.
Figure 8A:
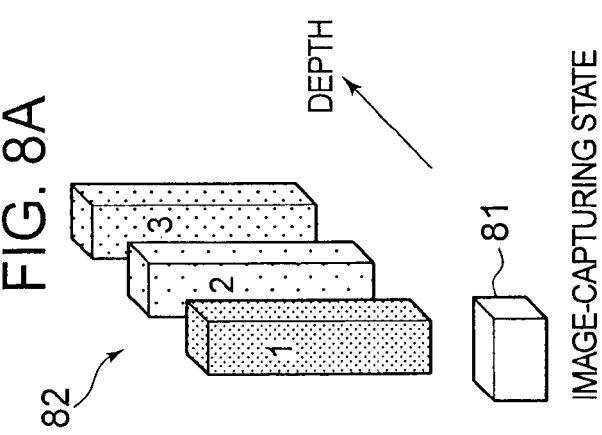
FIG. 8A is an image-capturing state.
Figure 8B:
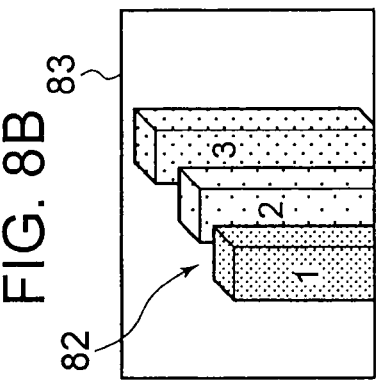
FIG. 8B is a successful example.

Further, in the event that camera shake occurs during image-capturing, advancing takes place in a direction where out-of-focusing takes place overall, and red marking 88 is displayed for all of the columns of the subject 82 as shown in FIG. 8D. Various display methods may also be considered such as displaying markings (e.g., colors as shown in FIG. 8E) at outline portions of portions for which out-of-focusing occurs, and the extent of out-of-focusing may also be made known to the user by displaying actual evaluation values.

In using the embodiment of the present invention, it is possible to also perform automatic determination on the side of the image-capturing apparatus for the occurrence of out-of-focusing that cannot be discerned by a low-resolution monitoring displaying at the display 6 shown in FIG. 1), and regions where out-of-focusing occurs in preview images during confirmation are also displayed. It is therefore straightforward for a user to be made aware of out-of-focusing.

Alternatively, in an embodiment of the present invention, if a time between the locking time and the capture time is determined to be longer than a prescribed time, it may be assumed that the current state is a conventional focus-and-locked image-capturing and a through-image may be captured again. Out-focusing may be determined by comparing an evaluation value for the image captured at the time of the locked image-capturing and an evaluation value for the image captured afterward, and it may be then possible to display regions where out-focusing occurs in a marked manner. Furthermore, as a variant of the approach of the above flowchart, it may be possible to output an error before capturing and perform processing in such a manner that it is not possible to press the shutter key 13.

Further, since three items of image information are recorded during image-capturing, it is therefore possible to be aware of the direction of camera shake in subsequent image processing using a personal computer or a digital camera, which may be useful in subsequent processing.

It should be understood by the those skilled in the art that various modifications, combinations, sub-combinations and alterations may occur depending on design requirements and other factors insofar as they are within the scope of the appended claims or equivalents thereof.

What is claimed is:

1. An image capturing apparatus that captures an image of a target subject by image capturing means via focus control of an optical system, displays a captured image on a display means, and records the captured image on a recording medium by recording means, the image capturing apparatus comprising:
    image acquisition means for acquiring a plurality of images;
    blurriness determination means for determining each region of the acquired plurality of images which is blurry, said blurriness determination means evaluating each image in its entirety for blurry regions, said blurriness determination means determining regions which are blurry due to shaking of the image capturing apparatus and due to a subject of the region being out-of-focus; and
    error display means for identifying an error region on the display means only for each region of the image determined to be blurry by the blurriness determination means, said error display means identifying the regions which are blurry due to shaking of the image capturing apparatus and due to a subject of the region being out-of-focus.

2. The image capturing apparatus according to claim 1, wherein:
    the acquired plurality of images are obtained immediately before and after a focus control operation.

3. The image capturing apparatus according to claim 1, wherein the acquired plurality of images comprise:
    a first image displayed on the display means before a focus control operation,
    a second image displayed on the display means after the focus control operation, and
    a third image displayed on the display means before recording to the recording medium by the recording means.

4. The image capturing apparatus according to claim 1, wherein:
    the error display means changes a display color of the error region to a color different from display colors of other regions.

5. The image capturing apparatus according to claim 1, further comprising:
    image storage means for storing the acquired plurality of images; and
    image interpolation means for performing interpolation on one of said acquired plurality of images based on a result of the blurriness determination means.

6. The image capturing apparatus according to claim 1, further comprising:
    image storage means for storing the acquired plurality of images; and
    image selection means for replacing one of said acquired plurality of images, which is determined to be blurry by the blurriness determination means, with an image with better focus, the image with better focus being a different one of the acquired plurality of images stored in the image storage means and selected based on a result of the blurriness determination means.

7. An image capturing method, comprising:
    acquiring a plurality of images;
    determining each region of the acquired plurality of images which is blurry, said determining including evaluating each image in its entirety for blurry regions, said determining including determining regions which are blurry due to shaking of an image capturing apparatus and due to a subject of the region being out-of-focus; and identifying an error region on a display means only for each region of the image determined to be blurry, said identifying including identifying the regions which are blurry due to shaking of the image capturing apparatus and due to a subject of the region being out-of-focus.

8. The image capturing method according to claim 7, wherein the acquired plurality of images comprise:
   a first image displayed on the display means before a focus control operation,
   a second image displayed on the display means after the focus control operation, and
   a third image displayed on the display means before recording to the recording medium by the recording means.

9. The image capturing method according to claim 7, further comprising:
   changing a display color of each error region to a color different from display colors of other regions.

10. An image capturing apparatus that captures an image of a target subject by an image capturing unit via focus control of an optical system, displays a captured image on a display unit, and records said captured image on a recording medium by a recording unit, the image capturing apparatus comprising:
    an image acquisition unit configured to acquire a plurality of images;
    a blurriness determination unit configured to determine each region of the acquired plurality of images which is blurry, said blurriness determination unit configured to evaluate each image in its entirety for blurry regions, said blurriness determination unit configured to determine regions which are blurry due to shaking of the image capturing apparatus and due to a subject of the region being out-of-focus; and
    an error display unit configured to identify an error region on the display unit only for each region of the image determined to be blurry by the blurriness determination unit, said error display unit configured to identify the regions which are blurry due to shaking of the image capturing apparatus and due to a subject of the region being out-of-focus.

11. The image capturing method according to claim 10, wherein the acquired plurality of images comprise:
    a first image displayed on the display means before a focus control operation,
    a second image displayed on the display means after the focus control operation, and
    a third image displayed on the display means before recording to the recording medium by the recording means.

12. The image capturing apparatus according to claim 10, wherein the error display unit is configured to change a display color of each error region to a color different from display colors of other regions.

13. The image capturing apparatus according to claim 12, wherein the error display unit is configured to change the display color of each error region to red and a color of the other regions to blue.

* * * * *